United States Patent [19]

Janitz

[11] Patent Number: 4,708,014

[45] Date of Patent: Nov. 24, 1987

[54] DEVICE FOR TESTING OF CONTAINERS AS TO LEAKAGE OR DEFECTS

[75] Inventor: Bernt Janitz, Dilling, Norway

[73] Assignee: 501 A/s Moss Glasveark, Moss, Norway

[21] Appl. No.: 849,511

[22] PCT Filed: Jul. 11, 1985

[86] PCT No.: PCT/NO85/00043

§ 371 Date: Mar. 5, 1986

§ 102(e) Date: Apr. 24, 1986

[87] PCT Pub. No.: WO86/00701

PCT Pub. Date: Jan. 30, 1986

[30] Foreign Application Priority Data

Jul. 13, 1984 [NO] Norway .................................. 842871

[51] Int. Cl.$^4$ ............................................. G01M 3/32
[52] U.S. Cl. ............................................. 73/37; 73/49.2
[58] Field of Search .................................... 73/49.2, 37

[56] References Cited

U.S. PATENT DOCUMENTS

| 3,771,649 | 11/1973 | Strauss | 73/37 |
| 3,805,593 | 4/1974 | Sandoz et al. | 73/49.2 |
| 3,805,594 | 4/1974 | Hayashi | 73/49.2 |
| 4,144,742 | 3/1979 | Schmidt et al. | 73/37 |
| 4,278,178 | 7/1981 | Pemberton et al. | 33/178 R |

Primary Examiner—Michael J. Tokar
Assistant Examiner—Hezron E. Williams
Attorney, Agent, or Firm—John H. Lynn

[57] ABSTRACT

A device for testing containers as to leakage and defects is comprised of a container sealing portion (4), a pressure exerting portion, and a pressure gauge (8). Said pressure exerting portion is provided in the shape of a piston/cylinder system (2, 3) that is maintained in an extended position by a tensioning means, e.g. a spring (5). Said container sealing portion (4) is provided either on the piston (2) or on the cylinder (3) for sealing contact with the container opening. The chamber between the cylinder (3) and the piston (2) is in communication with the pressure gauge (8) and, via a channel (13) in the container sealing portion (4), with the interior of the container (1). The device may, furthermore, be provided with a feeler means (12-19) for testing the container as to moulding films and the like.

4 Claims, 4 Drawing Figures

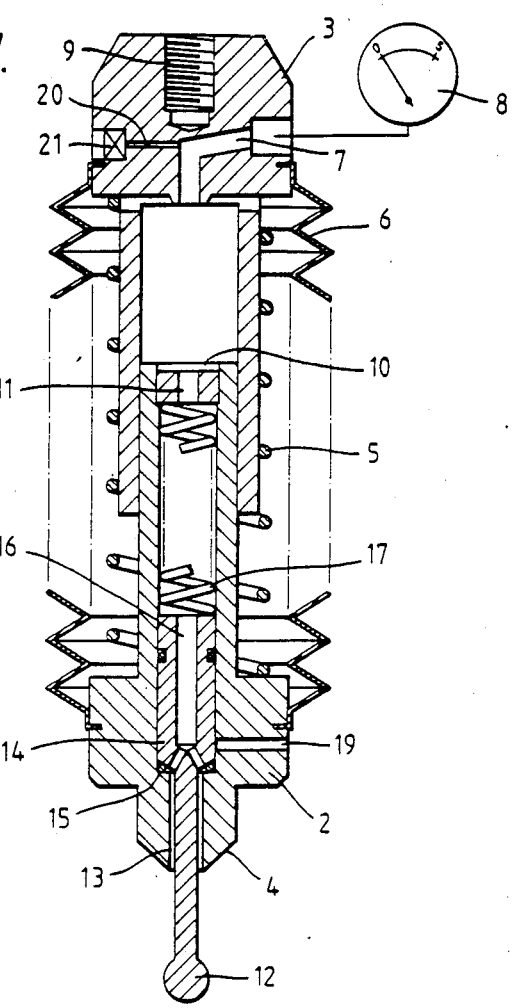
Fig.1.
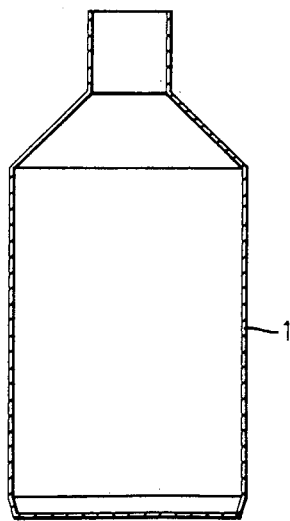

DEVICE FOR TESTING OF CONTAINERS AS TO LEAKAGE OR DEFECTS

BACKGROUND OF THE INVENTION

The present invention relates to a leak end defect testing device for containers, comprising a container sealing portion, a pressure exerting portion, and a pressure gauge.

When containers, especially plastic containers, are manufactured it is of great importance to be able to test the containers for leaks and defects before they are marketed.

A number of devices for this purpose are known. Most of them are intended for sequential testing each container being closed in a suitable manner and exposed to pressure, a differential pressure between the inside and outside of the container then being measured. If changes appear in said differential pressure the container is ejected. Examples of devices produced according to this principle are e.g. disclosed in GB-PS No. 1 123 997 and DE-AS No. 23 45 731.

In DE-OS No. 32 46 095, furthermore, a device for testing the sealing surfaces of a number of containers is disclosed.

All these known devices, however, have in common a relatively complicated structure comprising control means for ejecting discarded articles and for supplying new containers. The containers to be tested are preferably bottles made from plastic or glass. The known devices are also bulky.

There is, thus, a demand for a simple and easily handled device for testing containers, especially plastic bottles. It is especially desirable to be able to test such containers as to leakages and defects in one single step.

SUMMARY OF THE INVENTION

The present invention, thus, has the object to provide a device which satisfies said demands and by the aid of which containers may be tested in one step as to leakages and as to the shape of the container opening. Also, it would be advantageous if the container could simultaneously be tested as to any possible moulding defects, especially in the area of the container opening.

The testing device should be simple, non-expensive and reliable and it should, if desired, also be possible to use it for controlling other operations.

These objects are achieved with a device of the kind mentioned above which is characterized by the features appearing from the claims.

The device according to the invention has a very compact and simple structure and it may easily be used as a manual apparatus or as a device incorporated in the manufacturing step, said device easily being installable in existing conveying facilities in a container manufacturing plant, e.g. a plant having a production capacity of 2000 one-liter containers/hour. Said device can of course be installed in smaller plants as well as in plants having much greater capacity.

It will be appreciated that the device according to the invention as well as being used for testing containers that should be leak-proof can also be used for all kinds of limited volumes having any kind of opening or the like.

BRIEF DESCRIPTION OF THE DRAWINGS

The invention will now be described in more detail with reference to an embodiment shown in the accompanying drawing, where FIG. 1 shows a device according to the invention arranged above a plastic bottle to be tested.

DESCRIPTION OF THE PREFERRED EMBODIMENT

Figure 2:
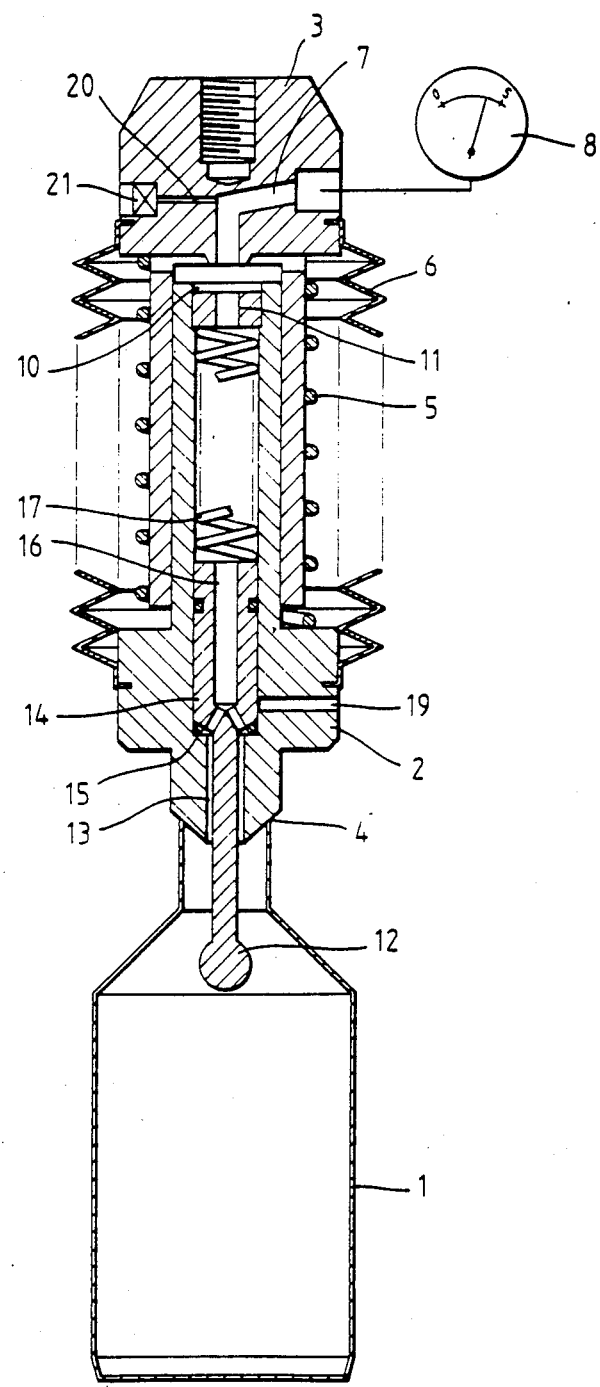
FIG. 2 shows the device according to the invention in a testing position on the bottle, this figure showing a leakproof bottle.

In the figures the present invention is shown as utilized for testing a recently moulded plastic bottle. Said bottle is designated 1. It should be mentioned in this connection that it is possible to test containers or "closed volumes" of quite different kinds, an adaption of the contact surfaces between the device and the container opening being the only necessary measure. The remaining functions of the device according to the invention will remain the same. It is also possible to test containers made from different kinds of materials, i.e. the invention is not limited to testing plastic containers.

The main component of the testing device according to the invention is a piston/cylinder system the piston means of which is designated 2 and the cylinder means being designated 3. The piston means 2 is comprised of a head and the piston itself being tube shaped in the shown embodiment. On said head means opposed to the piston there is a projecting part ending in a conical contact surface 4. The cylinder of the piston is also extending from a head means and envelopes the piston with part of its circumference. Said piston and cylinder are kept spaced from each other by the aid of a tensioning means, e.g. a spring 5. Said spring is surrounded by a bellows 6 which may also comprise a means limiting the relative extension of the piston/cylinder means. Said bellows may also form an exterior limit of said cylinder means being sealed against piston 2 and against cylinder part 3 making the space inside bellows 6 part of the "pressure exerting" space. This embodiment is indicated in the drawing by a channel shown in the area above said spring 5 below the wide portion of the cylinder.

In the cylinder head portion a channel is provided and extends towards a pressure indicator which is here generally shown as a pressure gauge but which may also comprise a warning light circuit controlled by a diaphragm means or the like. Such diaphragm means may be arranged in channel 7 and may also control other mechanisms in connection with the manufacturing of bottles. In the head of cylinder means, as indicated by 9, there may be provided attachment means for providing the device in another tool.

The piston of piston means 2, as mentioned is tube shaped and has an end disk 10 having a through opening 11 at its end. In the shown embodiment piston means 2 is, furthermore, provided with a movable feeler 12 for testing the container as to any moulding defects. Said feeler 12 has a spherical head and is rod-shaped and extended through a channel 13 in the head of piston means 2 and ending in a sealed off further piston 14 which is movable in piston 2. This further piston 14 is sealed against channel 13 by packings 15 at its lower end and is provided with an inner channel 16 extending to the tube shaped interior of piston 2. Inside this tube shaped interior space, between end disk 10 and the further piston 14 a spring 17 is provided and holds feeler 12 in a pressed-down position. Said head portion of piston 2 is also provided with a vent channel 19 sealed by piston 14.

Figure 3:
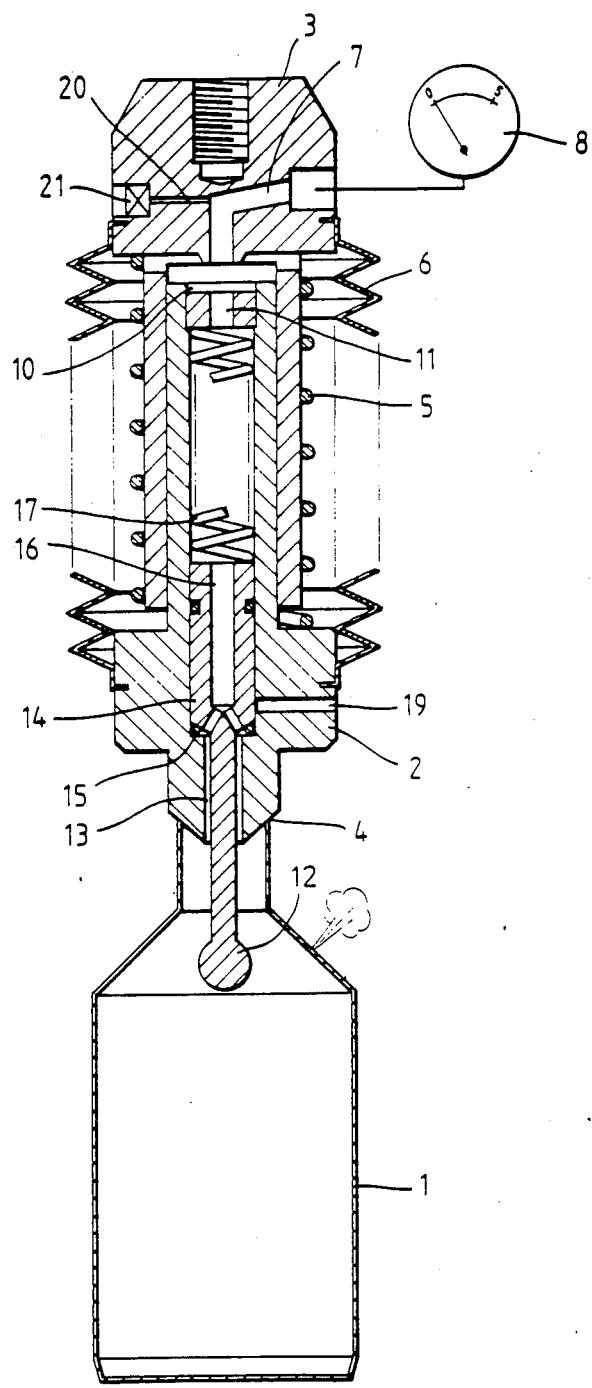
FIG. 3 shows the device in a testing position in a case of a leaking bottle.
Figure 4:
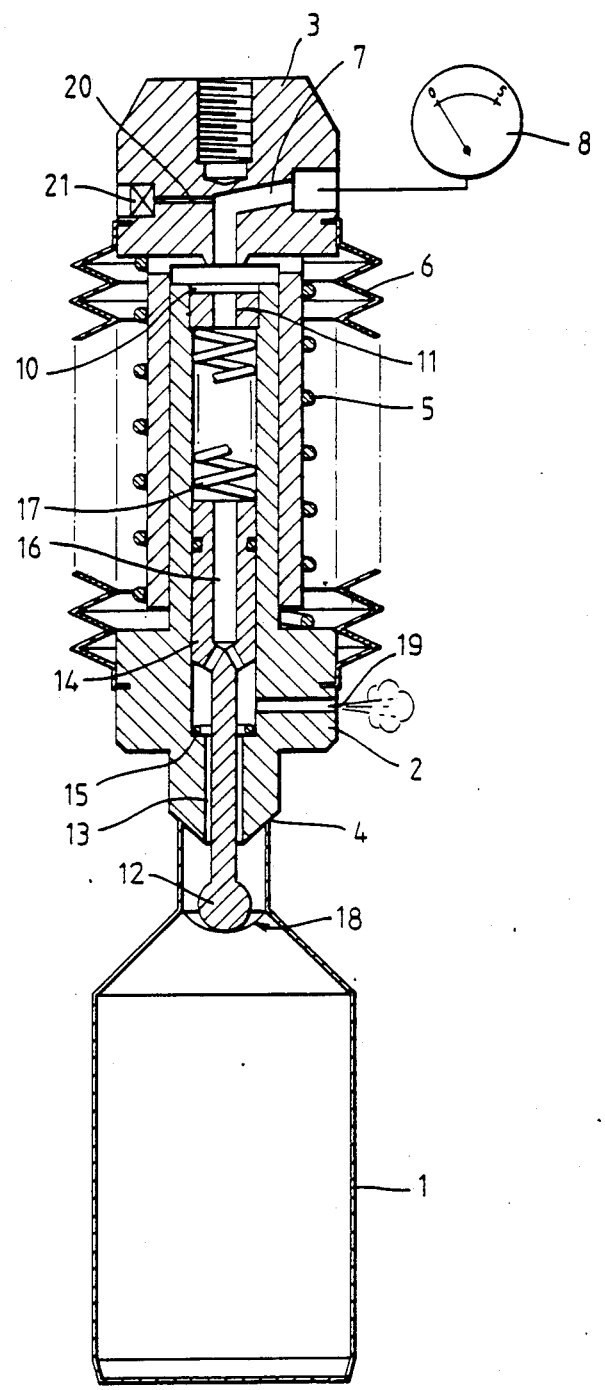
FIG. 4 shows the device according to the invention in a testing position on a bottle that has a moulding defect in the neck area.

The device operates as follows:

For testing a plastic bottle 1, the device is moved from the position shown in FIG. 1 to the position shown in FIG. 2. Contact surfaces 4 will then engage the bottle neck and if said bottle neck has no defects sealing is achieved here. The device according to the invention is pressed down towards the bottle, spring 5 and bellows 6 are compressed and cause an overpressure in bottle 1. This pressure is measurable through channels 13, 16 and 7. In case of a non-leaking bottle there will be a deflection of the pressure indicator as shown in FIG. 2. In case of a leaking bottle, as indicated in FIG. 3, the pressure indicator will not deflect to indicate pressure in the bottle. If there is a moulding defect in the bottle neck, which may easily occur when plastic bottles are moulded, i.e. a film is formed as indicated at 18 in FIG. 4, the head of feeler 12 will abut said film and urge the further piston 14 upwards inside piston 2. Thus channel 19 is opened and, again, pressure will decrease and indicate a defect.

If it is desirable to use the device according to the invention for different containers, i.e. containers having different volumes, it may be suitable to provide a pressure valve enabling a predetermined and constant pressure to be set in the containers during measuring. Such a means is indicated in the head of cylinder means 3, a further channel 20 branching off channel 7 and leading to a valve 21 that is opened at a predetermined pressure. Said valve 21 may be adjustable. Due to this feature bottles may be tested at the same pressure irrespective of their size.

It will be appreciated that it is essential that testing is carried out at a low pressure, since testing at a high pressure might cause defects or weakening of the container.

Obviously, the arrangement of piston and cylinder as well as springs may be varied. It is also possible to adapt the device for special applications, e.g. by omitting feeler 12 or providing a contact surface 4 of a different shape and if desired providing it with a certain feeler function.

I claim:

1. A device for pneumatic testing of containers especially plastic containers, as to leakage or defects, comprising: a first piston (2); a first cylinder chamber connected to an opening of a container through a channel in the first piston; a pressure gauge (8) for indicating pneumatic pressure in the first cylinder chamber; means for pressurizing the container; the first piston (2) including means for sealing the container opening when the container is pressurized, the pressurizing means (5) including a plurality of channels and openings (13, 16, 11, 7) for providing an air connection between the container and the pressure gauge (8); a second piston (14) slidably mounted in a cylinder in the first piston; means for biasing the second piston (14) toward the container, the first piston (2) including a vent channel (19) having a first end open to the atmosphere, the biasing means and second piston cooperating to form a seal at a second end of the vent channel (19) to prevent fluid communication between the container and the vent channel (19); and a rod shaped feeler (12) slidably mounted inside the first piston, the rod shaped feeler (12) being arranged to have a first end extending inside the container and a second end contacting the second piston such that contact between the feeler (12) and a defect blocking the container opening displaces the second piston to vent the container to the atmosphere.

2. A device according to claim 1, characterized in that a channel (20) has been provided in the cylinder head which ends in the atmosphere, in which channel an adjustable valve (21) has been provided for determining and maintaining a maximum pressure in the device and container.

3. A device according to claim 1, characterized in that the pressure gauge (8) comprises a pressure diaphragm controlled electronic circuit for controlling a warning lamp, ejecting mechanism or other equipment.

4. A device according to claim 1, characterized in that a bellow (6) is provided between said first piston means (2) and the cylinder means (3).

* * * * *